May 12, 1931. L. WALLFISCH 1,805,442
WEDGE SHAPED DRIVING BELT
Filed Dec. 14, 1929

Patented May 12, 1931

1,805,442

UNITED STATES PATENT OFFICE

LUDWIG WALLFISCH, OF HIRSCHBERG, GERMANY

WEDGE SHAPED DRIVING BELT

Application filed December 14, 1929, Serial No. 414,176, and in Germany December 14, 1928.

This invention relates to a wedge-shaped driving belt for power transmission. In comparison with the driving belts of known construction the belt according to the invention is of H-shaped cross section, so that the belt has two upper and two lower side flaps which, when the belt is moving around the corresponding belt pulley, bear tightly against the walls of the pulley owing to the curvature of this pulley, the upper flaps in outward direction and the lower flaps in inward direction. The belt pulley must, with this object in view, also be of wedge-shaped cross section so that it has an inner projecting bead against the side faces of which the inner faces of the lower side flaps of the belt can bear. As experiments have shown, such driving belt of H-shaped cross section is much more effective than a wedge-shaped belt of solid cross section or than a wedge-shaped belt with only one lower or upper groove.

Two embodiments of the invention are illustrated by way of example in the accompanying drawings in which.

Figures 1, 2:
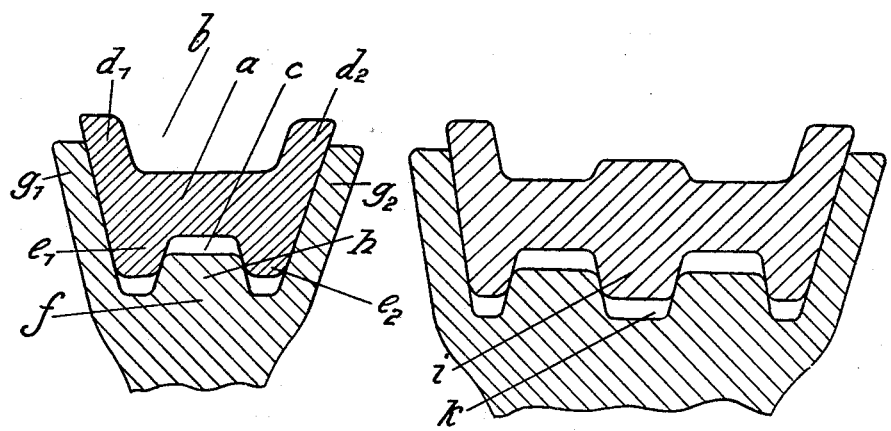
Fig. 1 shows in cross section a belt pulley with belt according to the invention.
Fig. 2 is a similar view showing a belt pulley and belt of modified form.

Referring to Fig. 1 the wedge-shaped belt $a$ has a groove $b$ in the upper side and a groove $c$ in the lower side, said grooves extending in the direction of the longitudinal axis of the belt.

Owing to these grooves $b$ and $c$ the belt is of H-shaped cross-section and two upper side flaps $d_1$ and $d_2$ and two lower side flaps $e_1$ and $e_2$ are formed. The belt pulley $f$ is shaped as shown, i. e. it is of wedge-shaped cross section with two outer side walls $g_1$ and $g_2$ and a projecting bead $h$ on the rim.

Owing to the curvature of the belt on the circumference of the pulley the upper side flaps $d_1$ and $d_2$ of the belt are pressed in outward direction against the inner surfaces of the side walls $g_1$ and $g_2$ of the pulley, whereas the inner surfaces of the lower side flaps $e_1$ and $c_2$ are pressed against the outer surfaces of the bead $h$ of the pulley.

The form of construction shown in Fig. 2 differs from that shown in Fig. 1 thereby that the wedge-shaped belt has, besides the side flaps, a central rib $i$ designed to engage with a corresponding groove $k$ in the circumference of the belt pulley. More than one rib and groove may be provided.

The lower surface of the driving belt mounted on the belt pulley must be a certain distance from the circumference of the belt pulley so that sufficient clearance exists to compensate for wear.

I claim:—

A wedge-shaped driving belt for power transmission which is of H-shaped cross section having two upper and two lower side flaps so that owing to the curvature of the belt around the belt pulley the upper side flaps bear against the pulley with their outer surface and the lower side flaps with their inner surface.

In testimony whereof I affix my signature.
LUDWIG WALLFISCH.